(No Model.)
T. A. EDISON.
APPARATUS FOR MAKING GLASS.
No. 506,216. Patented Oct. 10, 1893.
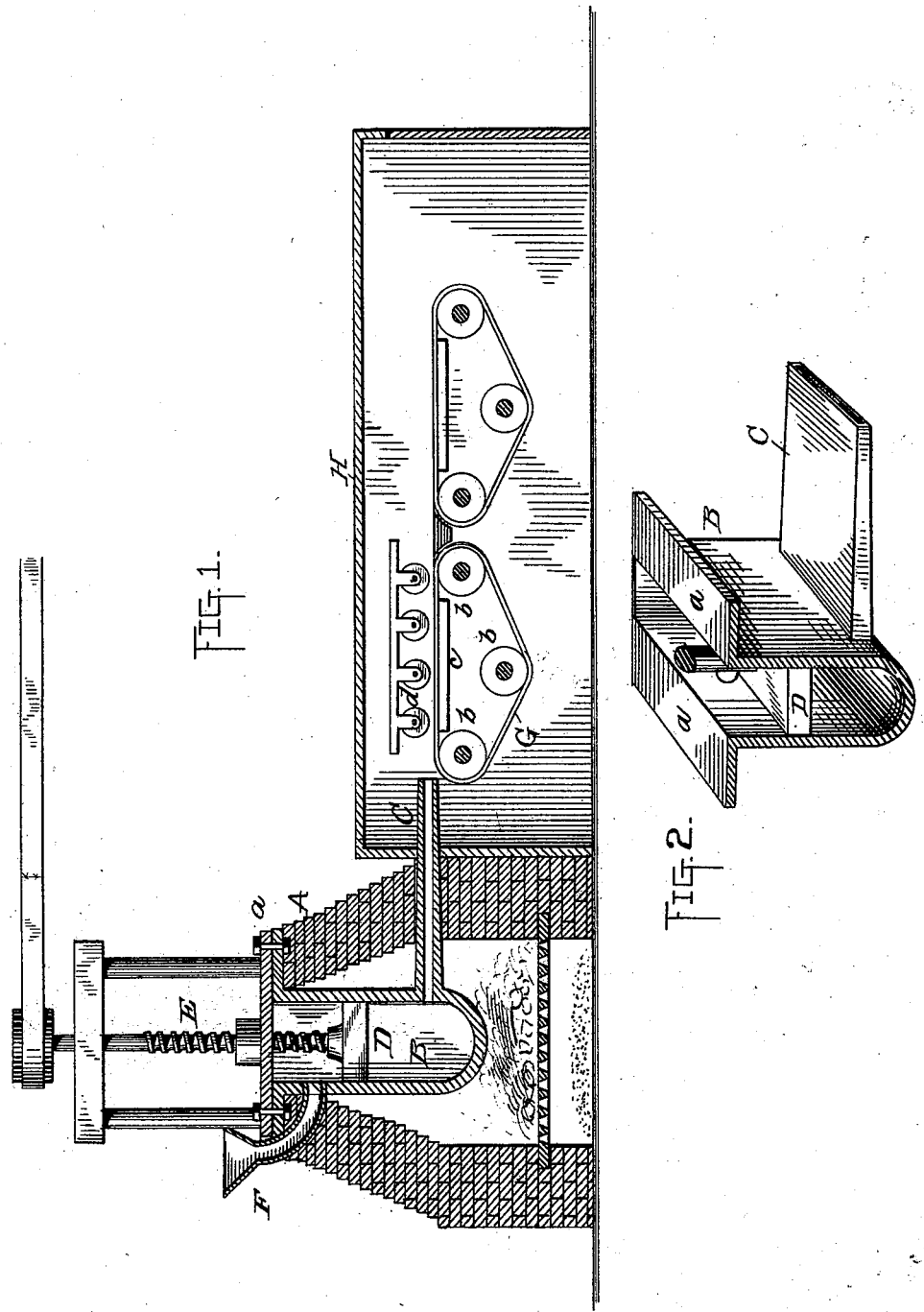
Witnesses
Inventor
Thomas A. Edison
By his Attorneys

UNITED STATES PATENT OFFICE.

THOMAS A. EDISON, OF LLEWELLYN PARK, NEW JERSEY, ASSIGNOR OF ONE-HALF TO EDWARD P. KING, OF CLEVELAND, AND WILLIAM D. BURGESS, GUSTAVUS HERMAN, AND MILTON CHURCHILL, OF TOLEDO, OHIO.

APPARATUS FOR MAKING GLASS.

SPECIFICATION forming part of Letters Patent No. 506,216, dated October 10, 1893.

Original application filed November 11, 1887, Serial No. 254,934. Divided and this application filed July 2, 1889. Serial No. 316,326. (No model.)

*To all whom it may concern:*

Be it known that I, THOMAS A. EDISON, a citizen of the United States, residing at Llewellyn Park, in the county of Essex and State of New Jersey, have invented a certain new and useful Apparatus for Making Glass, (Case No. 838,) of which the following is a specification.

In my prior application (Case No. 736), Serial No. 254,934, filed November 11, 1887, of which this application is a division, is set forth a method of making glass in various forms, such as sheets, plates, rods and tubes, which consists mainly in squeezing or pressing the glass, while the same is maintained by heat in a softened condition, through a suitable die or passage of the proper shape so that the glass issues therefrom in the form required.

The present application relates to the apparatus used with this method, such apparatus being shown and described but not claimed in the prior application above referred to.

In carrying my invention into effect I provide a pot or receptacle, in connection with a furnace by means of which the glass in the receptacle is heated. This receptacle is entered by a plunger forced down by a screw or by hydraulic pressure, and the die or passage extends from the wall of the receptacle so that when the plunger is depressed the softened glass is forced out through such die or passage, it being received preferably by a suitable conveyer in an annealing chamber.

My invention is illustrated in the accompanying drawings, in which—

Figure 1, is a vertical section of the furnace and annealing chamber; and Fig. 2, a perspective view and partial section of the melting pot and die.

A is a suitable furnace.

B is the melting pot or receptacle supported by flanges $a$ on the walls of the furnace. I prefer to make this pot of cast nickel, but it may be of iron lined with nickel or cobalt. The die C extends from this chamber. It is shown as of a flat shape designed for making sheets or plates of glass. It is evident however that the die may be of any desired shape or construction according to the kind of glass which is to be produced. The die like the melting pot is preferably made of or lined with nickel, so as to have a smoothly polished inner surface.

D is a plunger which fits the pot B and is forced down by means of a screw E turned by suitable power as indicated; or the plunger may be forced down by hydraulic or other pressure.

F is an inlet passage for filling the pot. The glass may be previously melted and then poured into the pot, the opening being then closed by a suitable plug. Such a degree of heat is maintained that the glass will cool down from a liquid form to a soft or pasty consistency, and will remain at this point while being operated upon. Instead of this however the glass may be first made and then broken into fragments and placed in the pot and re-melted and then allowed to assume and retain the pasty condition. The glass being in this condition the plunger is forced down upon it and it is then squeezed or squirted out through the die in the form of a sheet or in such other form as may be given by a die of any other shape. The sheet of glass is delivered from the die to a conveyer consisting of a sheet of metal band G moved by wheels or rollers $b$ which may be supported from the sides of the chamber H and moved by power applied to their shafts outside the chamber. The band G may run over a heavy plate or table $c$. As the sheet of glass is moved along it may pass under rollers $d$ to flatten it if desired. I employ several of these conveyers placed end to end the sheet of glass being delivered from one to the next, these conveyers being in the annealing chamber H. After nearly all the charge is run out of the melting chamber, the temperature may be increased to melt any glass which may adhere to the walls of the chamber. The plunger is then raised and a fresh charge put in.

If pieces of glass of different colors are mixed together and then placed in the chamber and heated to the softening point—but not melted—and then forced through the die the product will be a mottled glass with streaks of the various colors.

I do not claim herein the method of making glass as above described, as this is claimed in my application (Case No. 736), Serial No. 254,934, filed November 11, 1887, of which this application is a division.

What I claim is—

1. The combination of a glass-receiving chamber, means for heating the same, an outlet from such chamber having the shape required for the glass body and means for exerting pressure upon the glass in the chamber to force it through such outlet, substantially as set forth.

2. In apparatus for the manufacture of plate glass, the combination with a receptacle for containing the melted glass provided with an outlet orifice for the passage of the same, of a plunger adapted to reciprocate within said receptacle and press the glass through the orifice, substantially as set forth.

3. The combination of a glass-receiving chamber, means for heating the same, an outlet from such chamber having the shape required for the glass body and a plunger entering such chamber, substantially as set forth.

4. The combination of a glass-receiving chamber, means for heating the same, an outlet from such chamber having the shape required for the glass body, means for exerting pressure upon the glass in the chamber to force it through the outlet, and a conveyer receiving the glass as it issues from the chamber, substantially as set forth.

5. The combination of a glass-receiving chamber, means for heating the same, an outlet from such chamber having the shape required for the glass body, means for exerting pressure upon the glass in the chamber to force it through the outlet, and an annealing chamber for receiving the glass as it leaves such outlet, substantially as set forth.

This specification signed and witnessed this 29th day of June, 1889.

THOMAS A. EDISON.

Witnesses:
WILLIAM PELZER,
RICHD. N. DYER.